United States Patent [19]
Krueger

[11] 3,951,814
[45] *Apr. 20, 1976

[54] COALESCING UNIT FOR GRAVITY SEPARATOR

[75] Inventor: Dennis L. Krueger, Hudson, Wis.

[73] Assignee: Minnesota Mining and Manufacturing Company, St. Paul, Minn.

[ * ] Notice: The portion of the term of this patent subsequent to Nov. 12, 1991, has been disclaimed.

[22] Filed: Nov. 7, 1974

[21] Appl. No.: 521,787

Related U.S. Application Data

[63] Continuation of Ser. No. 407,965, Nov. 12, 1974, Pat. No. 3,847,821.

[52] U.S. Cl. .............................. 210/488; 210/DIG. 5
[51] Int. Cl.² .......................................... B01D 25/16
[58] Field of Search ..................................... 210/488

[56] References Cited
UNITED STATES PATENTS
3,847,821  11/1974  Krueger ............................. 210/488

Primary Examiner—John Adee
Attorney, Agent, or Firm—Alexander, Sell, Steldt & DeLaHunt

[57] ABSTRACT

A new separator that incorporates a new separator element is provided for removing a dispersed liquid phase from a continuous liquid phase. The new separator element comprises a plurality of discrete sections of coalescing and sorbing media interspersed in intimate contact with one another. The sections of coalescing media provide substantially continuous paths through the separator element for the liquid to be treated. As the liquid is conducted through the coalescing media, the dispersed liquid phase is sorbed from the coalescing media into the sorbing media, whereupon a cleaned continuous phase exits from the separator.

13 Claims, 7 Drawing Figures

COALESCING UNIT FOR GRAVITY SEPARATOR

REFERENCE TO RELATED APPLICATION

This application is a continuation of pending application Ser. No. 407,965, which issued Nov. 12, 1974 as U.S. Pat. No. 3,847,821.

BACKGROUND OF THE INVENTION

A conventional method for removing small amounts of oil from water (on the order of 5–1000 parts of oil per million parts of water) is to process the oil-contaminated water so as to form larger droplets of oil, and then allow the larger droplets to separate from the water by gravity. The larger droplets are typically formed by passing the oil-contaminated water through a coalescing medium, the processed liquid is conducted to a holding tank, where oil collected at the surface of the holding tank is drawn off, and the treated water discharged. The method is described in U.S. Pat. Nos. 2,933,191 and 3,417,015, and variations are described in U.S. Pat. Nos. 3,268,442 and 3,494,863.

One important deficiency with such gravity separators is that the coalescing units tend to become clogged. In an attempt to obtain purification down to a few parts per million, coalescing media having very fine pores have been proposed, and the result is that the coalescing media have high pressure drops and tend to clog easily, either with oil or with particulate matter entrained in the liquid being treated; see, for example, Chemical Week, Feb. 16, 1972, pp. 31 and 32.

Other methods of separating oil from water use so-called depth-bed filters and collect and store the oil within the filter. For example, U.S. Pat. No. 3,617,566, calls for forcibly passing oil-contaminated water through a vessel packed with flakes of atactic, noncrystalline polypropylene; the oil is said to collect on the flakes, and purified water is discharged from the vessel. More conventional depth-bed filters use particulates such as sand or gravel as the filter medium.

The depth-bed filters have several of the deficiencies described above. For example, a high degree of purification cannot be achieved unless the pores through the vessel are so fine that very high pressures are needed to force liquid through the packed vessel. And the needed pressures increase as oil is retained within the filter. Further, collection is generally by adsorption onto the surfaces of the particles, which is a rather limited area; and hydrodynamic forces developed as liquid is forced through the filter prevent collection of large layers of oil on the particles. To have appreciable capacity, conventional depth-bed filters must be quite large in size, and the movement of liquid through them is quite slow.

Another background teaching that has a peripheral relevance to the present invention is the prior use of a sorbing medium, that is, a medium that sorbs a liquid into itself and retains it there, to sorb one immiscible liquid from another liquid. Generally sorbing media have been used to remove a layer of oil from the surface of the water, as in U.S. Pat. No. 3,426,902, where a drum covered by a layer of polyurethane sponge is suggested for removing a layer of oil from the surface of water; or in U.S. Pat. No. 3,764,527, where a fibrous web is used to remove oil from a mixture of oil and water. Sorbing media have not generally been used to treat a liquid having a small amount of a dispersed liquid phase in a continuous liquid phase, especially where the liquid is a highly emulsified mechanical emulsion. A separator for emulsified liquids made from sorbing media would have low capacity because of the hydrodynamic forces discussed above for depth-bed filters.

SUMMARY OF THE INVENTION

The present invention provides a new separator for removing a dispersed liquid phase from a continuous liquid phase. Briefly, the new separator comprises 1) a housing having an inlet, an outlet, and a separation chamber between the inlet and outlet through which liquid being treated passes; and 2) a separator element that tightly occupies the inside of the separation chamber. The separator element comprises a plurality of discrete sections of two different kinds of media, which are denominated herein coalescing and sorbing media, interspersed in intimate contact with one another. The coalescing media has less resistance to liquid flow than the sorbing media, and extends longitudinally through the separator element (that is, from the point or points at which liquid enters the separator element to the point of points at which liquid leaves the separator element) so as to establish substantially continuous, thin, minimal-pressure-drop channels through the separator element for liquid being treated. The sorbing media is wetted by the dispersed liquid phase in preference to being wetted by the continuous liquid phase, so that during use of a separator of the invention, the dispersed liquid phase is sorbed into the sorbing media.

The composite, multisectioned separation medium of the separator element, with its combination of a sorbing medium in intimate contact with a coalescing medium through which liquid being treated passes, has a unique separating action. Probably several mechanisms contribute to this action. For example, separation probably occurs in part because the coalescing medium coalesces the dispersed liquid phase into larger droplets that eventually engage the sorbing media; in part because the coalescing medium directs dispersed phase droplets into a tortuous path that brings even uncoalesced droplets into engagement with the sorbing medium; and in part because droplets of dispersed phase liquid are moved in the coalescing media to the interface of the sorbing and coalescing medium by capillary forces. Whatever the full explanation, the sorbing medium very rapidly sorbs the dispersed phase liquid from the continuous phase liquid. This separation occurs even if the coalescing medium is more porous than the coalescing media of some prior-art separators, so as to provide low-pressure, non-clogging paths or channels through the separator element. And the separating action occurs with very fine droplets and very small amounts of dispersed liquid phase.

Generally, the continuous phase liquid does not travel through the sorbing medium but instead remains in the coalescing medium until exiting at the outlet end of the coalescing medium. The sorbing medium gradually fills with the dispersed liquid phase; when it is full, rather large droplets of the dispersed liquid phase are forced from the outlet end of the separator element. Most often a separator element of the invention is replaced when the sorbing medium has been filled with dispersed phase liquid. However, a separator element of the invention can be left in place for long periods of time to be used as a coalescing unit for a gravity separator, for example.

A separator of the invention has a number of advantages over prior-art devices for separating a dispersed liquid phase from a continuous liquid phase. First, a separator of the invention can be operated at a low applied pressure because of the low pressure drop through the separator. Separators of the invention generally will operate at pressures of less than 10 pounds per square inch, which means that they are useful with common, low-cost centrifugal pumps; and in fact, some separators of the invention may be used to treat liquids that are moved only by the force of gravity. Further, separators of the invention generally maintain a relatively constant low-pressure drop over their whole period of use, without clogging.

In addition, separators of the invention operate whether or not there are specific gravity differences between the dispersed liquid phase and the continuous liquid phase of the liquid being treated. Separators of the invention are useful with a wide range of influent liquids and need not be tailored for a particular kind of liquid. Separators of the invention are generally used with mechanical mixtures comprising a first liquid that forms a major, continuous phase and a second liquid that is immiscible in the first liquid and is dispersed in the first liquid to form a minor, dispersed or discontinuous phase. The most common liquid to be treated in a separator of the invention is oil-contaminated water, but coalescing and sorbing media are available for treating other liquids also, and separator elements of the invention are formed from such media also. A separator element of the invention is typically used to treat a liquid containing small amounts of a dispersed liquid phase, but it may also be used to treat a more heavily contaminated liquid for a shorter period of time, as when bilge water is removed from a ship or when water carrying an oil slick is treated.

Additional important advantages arise from the fact that separators of the invention are compact in size; simple in construction, with generally no moving parts; simple in operation; and inexpensive to purchase and operate. But despite the several features and advantages named above, separators of the invention will remove small amounts of dispersed liquid phase in even highly emulsified mechanical dispersions to achieve a high degree of purity, typically leaving less than 5 parts per million, and even less than 1 or 2 parts per million, of the dispersed liquid phase.

DETAILED DESCRIPTION

Figure 1:
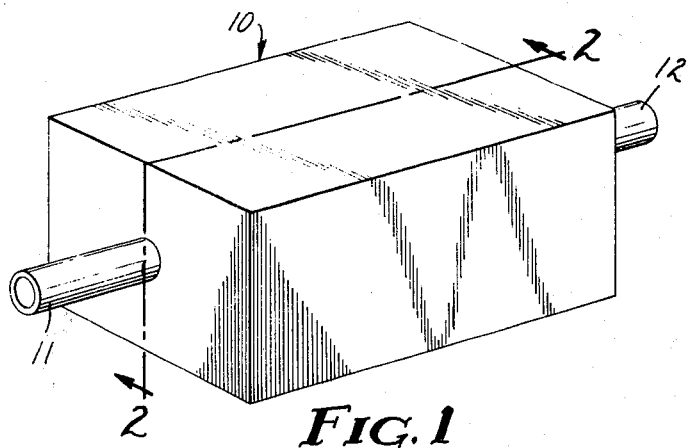
FIG. 1 is a schematic illustration in perspective of a separator of the invention.

A wide variety of known coalescing media are useful in separators of the invention, including fibrous webs, such as webs of glass fibers, synthetic polymeric fibers, or naturally occurring fibers; reticulate or open-celled foams; and beds of small discrete particles. Although the coalescing medium in a separator of the invention does not necessarily coalesce smaller droplets of a dispersed liquid phase passing through the medium into larger droplets, materials that function in that way have been found to be ideally useful together with a sorbing medium in a separator of the invention. A suitable coalescing medium can usually be selected by conducting a test in which a liquid to be treated that contains a mechanical emulsion of dispersed liquid phase in a continuous liquid phase is passed through a sample of the coalescing medium, and the size of droplets entering and leaving the coalescing medium measured.

The coalescing medium has less resistance to liquid flow than the sorbing medium, so that the coalescing medium will provide a minimal-pressure-drop path through the separator element. Under ideal operating conditions in a separator of the invention, the continuous phase of a liquid being treated never passes into or through the sorbing medium, but instead moves through the separator element solely in the coalescing medium.

The layers of coalescing media in a separator element of the invention should be rather thin, so as to assure engagement of the dispersed liquid phase with the adjacent layers of sorbent media. The thickness of the layers depends somewhat on the length of travel of liquid through the separator element, but desirably a layer of coalescing medium is less than one-half inch thick, and more preferably is less than one-fourth inch thick in uncompressed form.

The coalescing medium in a separator element of the invention may or may not be wetted by either the continuous phase or dispersed phase liquids; thus the coalescing media for separating oil from water may be either hydrophobic or hydrophilic. Preferably, the sorbing medium in a separator element of the invention is not wetted at all by the continuous phase liquid. But in any event the sorbing medium should be wetted by the dispersed liquid phase in preference to being wetted by the continuous liquid phase. Such a preferential wetting is easily tested by first submerging a sample of sorbing medium in the liquid of either the dispersed or continuous phase and then releasing a drop of the other liquid onto the wetted sample. For a sample of sorbing medium to be useful in a separator of the invention, a droplet of the continuous-phase liquid should not displace the dispersed-phase liquid from a sample of wetted sorbing medium, but a droplet of dispersed-phase liquid should displace continuous-phase liquid from the sample of wetted sorbing medium, assuming the sorbing medium is wet at all by the continuous-phase liquid.

In general, useful sorbing media are high-void-volume, porous materials in which the pores at least approach capillary size, and they sorb into themselves significant amounts of the dispersed phase liquid; generally, when tested outside a separator element of the invention, they will sorb a weight at least equal to their own weight, and preferably equal to 5 to 10 times their own weight. (It should be noted that sorption can occur in generally three ways: filling of interstices within the sorbing media; and either adsorption onto the surfaces of, or absorption within, fibers or other fine structure of the sorbing media.)

Particularly preferred sorbing media are webs of microfibers (generally averaging less than about 20 micrometers, and preferably less than about 10 micrometers, in diameter) of polymers such as polyolefins, polystyrene, polyesters, and polyamides. Polymers based on (that is, having a major portion of their monomer constituents) olefins, particularly ethylene and propylene, and styrene are especially preferred. Microfiber webs are generally formed by blowing techniques such as described in Wente, Van A., "Superfine Thermoplastic Fibers,"Industrial Engineering Chemistry, 342, Volume 48, page 1342 seq (1956), as well as such patents as Francis, U.S. Pat. No. 2,464,301; Ladisch, U.S. Pat. No. 2,612,679; and Till et al, U.S. Pat. No. 3,073,735. In these processes a liquified, normally solid polymeric material is extruded through an orifice into a high-velocity gaseous stream that draws out and attenuates the extruded material into very fine fibers, which the solidify during travel in the gaseous stream to a collector.

Less preferred fibers webs may also be formed from preformed synthetic or naturally occuring fibers on a carding or garnetting machine. In general, the fibers in sorbing media of the invention range in diameter from about 0.1 to 250 micrometers. The lower the density of the web (commensurate with the density and viscosity of the dispersed phase to be removed, which governs the size of the interstices that can retain the oil as a body, rather than as a film on the surface of the fibers), the more capable the web is to receive and retain large amounts of dispersed phase. Other useful sorbing media besides fibrous webs include open-celled foams, beds of particulate matter, and porous or so-called imbibing solids such as small spheres of lightly-crosslinked polymers such as polystyrene, which have fine capillaries that sorb and hold a liquid. It should be noted that the coalescing and sorbing media in a separator element of the invention may be made of the same materials, with the coalescing media being more porous to achieve less resistance to flow of liquid through the separator element.

Layers of sorbing media can generally be thicker than the layers of coalescing media, but still are rather thin. The thicker the layers of sorbing media, the fewer will be the minimal-pressure-drop channels through the separator element, for a given cross-sectional area of separator element, and the higher will be the pressure drop through the separator element. Preferably, the layers of sorbing media are less than about three-fourths inch thick, and more preferably are less than half that thick.

Layers of coalescing media and sorbing media are generally simply laid up in alternating fashion to form a separator element of the invention. To assure intimate contact between adjacent layers and between the whole separator element and the housing of the separation chamber, the separator element is inserted under compression into the separation chamber. Compression is also useful to reduce pore size in a separator element to improve coalescing or sorbing properties. On the other hand, compression reduces the capacity of the sorbing media to hold collected dispersed-phase liquid. By varying compression, various properties of the separator element can be controlled, including the pressure drop through the separator element, and the degree of removal of the dispersed liquid.

A separator element of the invention usually takes the form of a preassembled unit that may be replaceably inserted in a separator housing. For example, an assembly of layers of coalescing and sorbing media may be encased within a permeable membrane, such as a perforated heat-shrinkable film, to form a replaceable cartridge. When a separator element of the invention is inserted into a separator housing, sealants or gaskets may be used between the separator element and the separator housing to assure that the liquid being treated passes through the element. A separator element of the invention can be reconditioned by removing collected dispersed liquid phase, as by subjecting the element to pressure or solvent-extraction.

Figure 2:
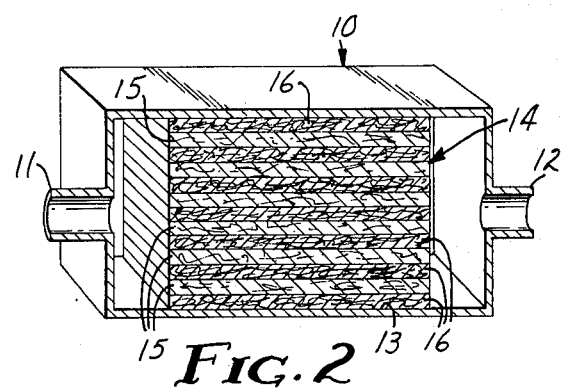
FIG. 2 is a sectional view in perspective of the separator of FIG. 1 taken along the lines 2—2 in FIG. 1.

The illustrative separator of the invention 10 shown in FIGS. 1 and 2 comprises an exterior housing providing an inlet 11, an outlet 12, a separation chamber 13, and a separator element of the invention 14 tightly occupying the inside of the separation chamber. The separator element 14 comprises alternate layers of coalescing media 15 and sorbing media 16. A liquid being treated is conducted through the inlet 11 into the separation chamber, and then travels on the plurality of paths or channels provided by the several layers of coaliscing media. The dispersed phase of the liquid being treated is sorbed out of the coalescing media into the sorbing media, and the treated liquid then passes out the outlet 12.

Figure 3:
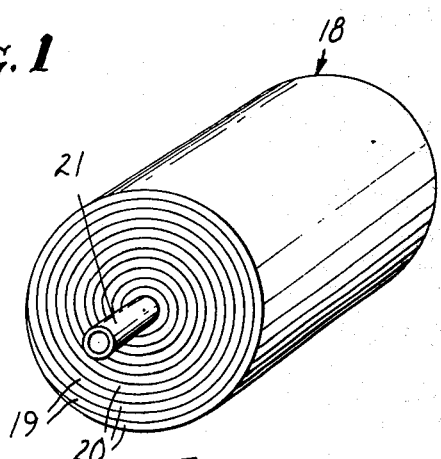
FIG. 3 is a perspective view of a separator element used in a different separator of the invention.

In FIG. 3 the separator element 18 comprises alternate layers 19 and 20 of coalescing and sorbing media, respectively, in a spiral configuration. The layers of coalescing and sorbing media are preferably would upon a mandrel 21, which may be a pipe used to return treated liquid to an outlet, and which assures tight compression of the media.

Figure 4:
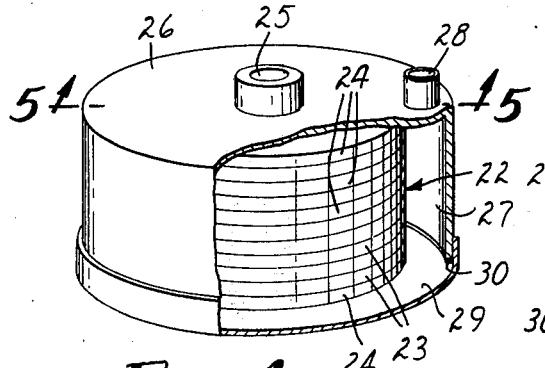
FIG. 4 is a perspective view of another separator of the invention, with part of the separator housing broken away to show internal parts.

In FIG. 4 the separator element 22 comprises alternate layers 23 and 24 of coalescing and sorbing media, respectively, in the form of annular discs having a central circular opening through which the liquid being treated is introduced or removed. In the embodiment illustrated, liquid is introduced through an inlet 25 in the housing 26, travels through the separation medium to a collection chamber 27, and then is conducted through an outlet 28 (alternatively liquid to be treated can be introduced through the opening 28 and removed from the opening 25). The separator element 22 is introduced into the separator by removing a bottom plate 29, and the element is placed under pressure by tightening of the plate 29. A gasket 30 seals the joint between the plate 29 and the housing 26, and a lip 31 and elevation 32 are provided to hold the separator element in position.

Figure 6:
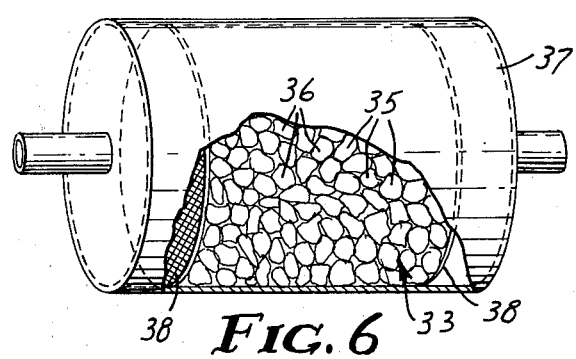
FIG. 6 is a perspective view of another separator of the invention, with part of the exterior housing of the separator broken away to show internal parts.

In FIG. 6 the separator element 33 comprises a random assembly of coalescing and sorbing media segments 35 and 36 respectively, compressed inside a housing 37 by screens 38. The segments 35 and 36 may be shredded pieces of fibrous web, for example. Although the coalescing and sorbing segments are randomly distributed in the separator element, the coalescing media segments provide a random substantially continuous path from the inlet to the outlet of the separator housing for the liquid being treated.

The interspersed sections of coalescing and sorbing media in a separator element of the invention need not be coextensive. For example, the coalescing media can extend beyond the sorbing media into an influent stream; or the coalescing media can be less extensive than the sorbing media. In the latter case, porous spacers are generally included between the layers of sorbing media in the areas not occupied by coalescing media to provide uniform flow paths through the separation medium. Liquid to be treated is conducted between the layers of sorbing media, through the porous spacers and the coalescing media. The dispersed phase is sorbed into the sorbing media, generally at the juncture of the coalescing and sorbing media, and then migrates within the sorbing media to fully occupy the sorbing media.

The longer the length of travel through a separator element of the invention, the more thoroughly will the dispersed liquid phase generally be removed from a liquid being treated. On the other hand, long separator elements have high pressure drops. Typically, the normal length of travel (that is, the distance between inlet and outlet of the separator element) will be 1 to 20 inches, but wide variation is possible for particular purposes.

Figure 7:
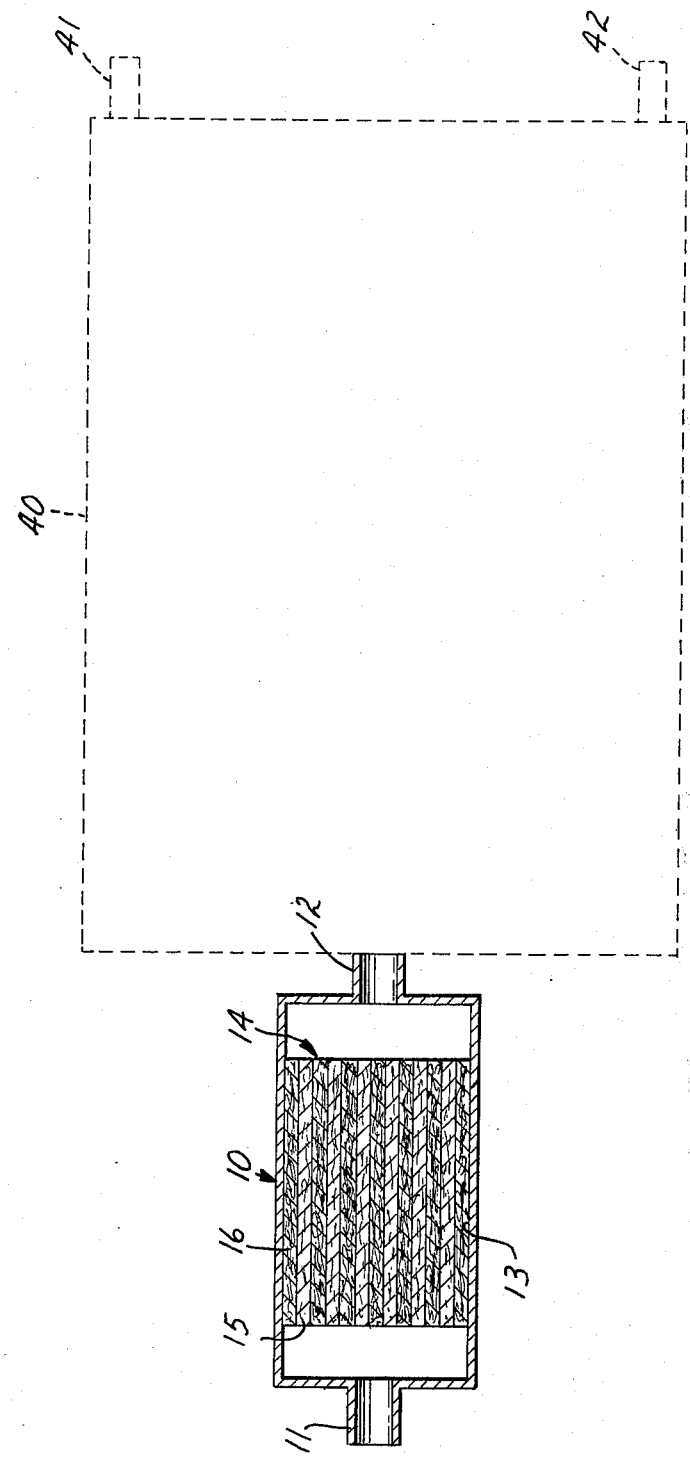
FIG. 7 is a sectional schematic view of the separator of FIGS. 1 and 2 connected to the holding tank of a gravity separator.

FIG. 7 illustrates the use of a separator of the invention as a coalescing unit for a gravity separator. In this representative gravity separator, the separator 10 illustrated in FIGS. 1 and 2 is connected to a holding tank 40, which is represented by dashed lines. When oil-contaminated water is passed through such a gravity separator, the oil collected at the surface of the holding tank is drawn off through an outlet 41 and treated water is discharged through an outlet 42.

The invention will be further illustrated by the following examples. In each of these examples the amount of oil in effluent from the separator tested was measured by light absorbtion in methyl isobutyl ketone. In this procedure, 5 hundred grams of effluent are placed, together with 80 grams of reagent-grade methyl isobutyl ketone, in a separatory funnel. The funnel is allowed to stand for ten minutes, except that it is shaken initially and then again at elapsed times of 2, 4 and 6 minutes. The separated water and methyl isobutyl ketone are then poured into separate flasks, and the walls of the funnel rinsed with an additional 10 grams of methyl isobutyl ketone; the additional 10 grams is then added to the previously collected methyl isobutyl ketone. The combined sample is then tested in a Coleman Model 900 colorimeter in which a Filter No. 8—203 (having peaks at 430 milimicrons) has been inserted. A calibration curve is then developed, plotting readings on the colorimeter on one axis and parts per million of oil on the other axis. It should be noted that the method measures both the amount of dispersed and dissolved oil in the sample tested.

The useful life of a tested separator element was considered as the time until a distinct change in the amount of oil appearing in the effluent occured. The measured life in a test was multiplied by factors necessary to normalize the results as to oil concentration in the influent, size of separator, and flow rate through the separator. Thus, the life stated in the examples is for an oil concentration in the influent of 100 parts by weight of oil per million parts by weight of sample, with a one-square-foot frontal area of separator element, a one-foot length of separator element, and a flow rate of 10 gallons per minute per square foot of frontal area of separator element. The volume of separator element wet with dispersed phase was determined visually and was stated as a percentage of the sorbing medium and as a percentage of the whole separator element (the combined sorbing and coalescing media). The oil retained in the sorbing medium and in the whole separator element was determined as a ratio of weight of oil per weight of that part of the sorbing medium or the whole separator element that had been wetted in the test.

In all of the examples, the continuous phase was tap water at room temperature (25°C), and, except in Examples 6 to 9, the dispersed phase was crude oil identified as 34° API crude. The oil was dispersed in the water to form a stable emulsion in which 95 percent of the droplets were greater than 1.2 micrometers in diameter, 50 percent were greater than 3.9 micrometers in diameter, and 5 percent were greater than 7.6 micrometers in diameter. Unless otherwise specified in the examples, the influent was introduced to the separator at a flow rate of 9.47 gallons/minute/square foot of frontal area of the separator element. (The frontal area for a disc-type separator as described in Example 1 is taken as that area which is normal to the direction of flow through the separator and is located at a radial distance from the center axis of the disc such that the volume of the separator element on either side of this distance is equal.) Unless otherwise specified in the examples, the effluent contained less than 5 parts per million of oil during the life of the test.

EXAMPLE 1

Figure 5:
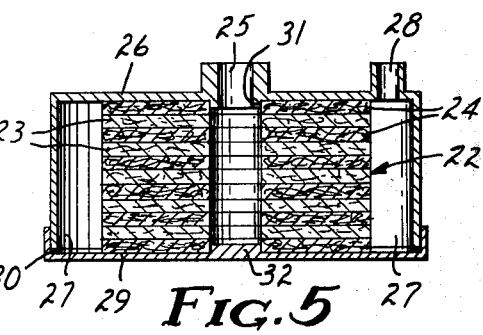
FIG. 5 is a section through a separator of FIG. 4 taken along the lines 5—5 in FIG. 4.

A separator element such as shown in FIGS. 4 and 5 was prepared using six 3/16-inch-thick webs having a weight of 6 ounces per square yard of melt-blown polypropylene microfibers averaging about 2 micrometers in diameter (3M Brand Oil Sorbent) as the sorbing media, and five 3/16-inch-thick, one-pound-per-cubic-foot webs of 0.00018-inch-diameter (4.2-micrometer-diameter) glass fibers bounded together with a thermosetting resin as the coalescing media. The webs were 9 ¾ inch in diameter and had a circular opening at their center 2 ¾ inch in diameter. The layers were compressed to a total thickness of 11/16 inch, meaning that the separator element was compressed to 31.5% of its original thickness. Water contaminated with 394 parts per million of crude oil was introduced through a pipe into the center opening of the separator element. The oil concentration in the effluent was measured as less than 1.2 parts per million and the flow rate was 9.6 gallons per minute per square foot. The normalized life for the test was 26 hours. After the test was completed, the separator element was disassembled, whereupon it was discovered that the sorbing media appeared totally saturated with oil. The sorbing media contained 2.86 grams of oil per gram of wetted sorbing media, and the separator element contained 1.99 grams of oil per gram of wetted separator element.

EXAMPLE 2

This example shows the use of reticulate polyurethane foam having about 80 cells per lineal inch as a coalescing media. The same sorbing media as used in Example 1, the same number of layers, and the same configuration of Example 1 were used. A dispersion of 453 parts per million crude oil in water was introduced into the separator. The life of the separator element was 20 hours per cubic foot of separator element; and 1.92 grams of oil per gram of wetted sorbing media, and 1.45 grams of oil per gram of wetted separator element were retained in the separator element. One hundred percent of the separator element appeared to have been wetted by oil.

EXAMPLES 3 – 5

These examples illustrate the use of different sorbing media in separator elements of the invention. In Examples 3 and 4 the sorbing media were webs such as described in Example 1, but had weights of 18 and 24 ounces per square yard, respectively. In Example 5, the sorbing medium was a web of irregular porous polystyrene fibers having an average diameter of about 18 micrometers, with the web having a weight of 1.6 pounds per cubic foot, a thickness of 0.18 inch. The number of layers of sorbing and coalescing media and the configuration were as described in Example 1. The results were as follows:

| Ex. No. | Oil Retained Sorbing Media (gm/gm of media) | Separator Element (gm/gm of media) | Volume of Separator Element Used (Percent) | Life (Hrs/ Cu. Ft.) | Flow Rate (gal/ min/ sq.ft) | Oil Concentration in Influent (ppm) |
|---|---|---|---|---|---|---|
| 3 | 1.43 | 1.23 | 65 | 15.7 | 4.42 | 323.8 |
| 4 | 1.30 | 1.18 | 75 | 20.2 | 3.47 | 302.1 |
| 5 | 0.98 | 0.79 | 70 | 12.2 | 9.47 | 476.9 |

EXAMPLES 6 – 10

These examples show the use of a separator of the invention to separate other oils from water besides crude oil. In Example 6, the test sample contained 522.9 parts per million of No. 2 fuel oil, which has a viscosity of 15.5 centipoises at room temperature; in Example 7, 208.6 parts per million SAE No. 10 motor oil (a high detergent oil) which has a viscosity of 90 centipoises at room temperature, was used; in Example 8, 159.4 parts per million of soybean oil, which has viscosity of 84 centipoises at room temperature, was used; in Example 9, 451.4 parts per million of toluene, which as a viscosity of 0.59 centipoise at room temperature was used; and in Example 10, 477.1 parts per million of a mixture of Bunker C oil having a viscosity of 6,000 centipoise and No. 2 fuel oil to give a total viscosity of 1,324 centipoises was used. These liquids were passed through a separator as described in Example 1. The results were as follows:

| Ex. No. | Kind of Oil | Oil Retained Sorbing Media (gm/gm of media) | Separator Element (gm/gm of media) | Volume of Separator Element Used (Percent) | Life (Hrs/ Cu. Ft.) |
|---|---|---|---|---|---|
| 6 | No. 2 fuel oil | 2.83 | 1.80 | 100 | 15.6 |
| 7 | Motoroil (SAE No.10) | 1.98 | 1.44 | 100 | 16.4 |
| 8 | Soybean oil | 2.27 | 1.44 | 70 | 18.6 |
| 9 | Toluene | —* | —* | 100 | 93.6* |
| 10 | Mixture (Bunker C & No. 2 fuel oil) | 4.58 | 3.19 | 90 | 34.5 |

*point of failure was not clear, but the effluent appeared excellent at least until the time that the oil (toluene) retained was estimated to be at least 3 grams/gram of media

EXAMPLES 11 – 13

These examples illustrate the use of a separator of the invention to treat water contaminated with different amounts of oil. In Example 11, the water contained 290.7 parts per million, in Example 12, 599.6 parts per million, and in Example 13, 1,515.4 parts per million. The test liquids were separated in a separator element as described in Example 1, except that the coalescing media were one-fourth-inch-thick phenolic-resin-impregnated webs of 5.9-micrometer-diameter glass fibers weighing 1 pound per cubic foot (Owens-Corning "Aerocor" Insulation, type PF3360). The results were as follows:

| Ex. No. | Oil Concentration in Influent (ppm) | Oil Concentration in Effluent (ppm) | Oil Retained Sorbing Media (gm/gm of media) | Separator Element (gm/gm of media) | Volume of Separator Element Used (Percent) | Flow Rate (gal/ min/ sq.ft) |
|---|---|---|---|---|---|---|
| 11 | 290.7 | 0.5 | 2.27 | 1.48 | 95 | 9.47 |
| 12 | 599.6 | 1.5 | 2.43 | 1.52 | 95 | 9.47 |
| 13 | 1,515.4 | 8.0 | 3.04 | 1.69 | 100 | 9.47 |

EXAMPLES 14 – 17

These examples illustrate the use of different flow rates for passing a liquid to be treated through a separator of the invention. In Example 14 the flow rate was 1.44 gallons per minute per square foot or frontal area of separator element; in Example 15 the flow rate was 4.74 gallons per minute per square foot; in Example 16 the flow rate was 9.47 gallons per minute per square foot; and in Example 17 the flow rate was 18.99 gallons per minute per square foot. The separator element used was as described for Examples 11 – 13. The results were as follows:

| Ex. No. | Oil Retained Sorbing Media (gm/gm of media) | Oil Retained Separator Element (gm/gm of media) | Volume of Separator Element Used (Percent) | Flow Rate (gal/min/sq.ft) | Oil Concentration in Effluent (ppm) |
|---|---|---|---|---|---|
| 14 | 3.48 | 2.08 | 95 | 1.44 | 0.7 |
| 15 | 2.89 | 1.80 | 95 | 4.74 | 0.7 |
| 16 | 2.41 | 1.51 | 95 | 9.47 | 1.2 |
| 17 | 1.86 | 1.16 | 85 | 18.99 | 4.0 |

What is claimed is:

1. In a gravity separator for treating a liquid to remove a dispersed liquid phase from a continuous liquid phase, a coalescing unit comprising 1) a housing having an inlet, an outlet, and a separation chamber between the inlet and outlet through which liquid being treated passes; and 2) a separator element that tightly occupies the inside of the separation chamber and comprises a plurality of discrete sections of coalescing and sorbing media interspersed in intimate contact with one another; the coalescing media having less resistance to liquid flow than the sorbing media, and extending longitudinally through the separator element so as to establish substantially continuous thin minimal-pressure-drop channels for liquid being treated, and directing dispersed liquid phase to the interface of the coalescing and sorbing media; and the sorbing media being wetted by the dispersed liquid phase in preference to being wetted by the continuous liquid phase, whereby the dispersed liquid phase is sorbed into the sorbing media and ultimately exits from the outlet end of the separator element as an effluent capable of separating from the continuous liquid phase by gravity.

2. In a gravity separator of claim 1, a coalescing unit in which the sections of coalescing and sorbing media are thin layers stacked in an alternating pattern.

3. In a gravity separator of claim 2, a coalescing unit in which the layers are flat, and liquid being treated travels from one end of the layers through the layers and out to opposite end of the layers.

4. In a gravity separator of claim 2, a coalescing unit in which the layers are flat and disc-shaped and have an opening along their central axis through which liquid being treated is passed.

5. In a gravity separator of claim 1, a coalescing unit in which the sections of coalescing and sorbing media are thin layers wound in a spiral configuration.

6. In a gravity separator of claim 1, a coalescing unit in which the coalescing media comprises a web of glass fibers.

7. In a gravity separator of claim 1, a coalescing unit in which the sorbing media comprises a web of microfibers that average less than 20 micrometers in diameter.

8. In a gravity separator of claim 1, a coalescing unit in which the sorbing media comprises polymers based on ethylene, propylene, or styrene.

9. In a gravity separator for treating a liquid to remove a dispersed liquid phase from a continuous liquid phase, a coalescing unit comprising 1) a housing having an inlet, an outlet, and a separation chamber between the inlet and outlet through which liquid being treated passes; and 2) a separator element that tightly occupies the inside of the separation chamber and comprises a plurality of thin stacked alternate layers of coalescing and sorbing media, the layers being in intimate contact with one another and extending parallel to the direction of travel of liquid through the separation chamber; the coalescing media having less resistance to liquid flow than the sorbing media, whereby the coalescing media establish substantially continuous thin minimal-pressure-drop channels through the separator element for liquid being treated, and direct dispersed liquid phase to the interface of the coalescing and sorbing media; and the sorbing media comprising a web of microfibers that average less than about 20 micrometers in diameter and that are wetted by the dispersed liquid phase, whereby the dispersed liquid phase is sorbed into the sorbing media, and ultimately exits from the outlet end of the separator element as an effluent capable of separating from the continuous liquid phase by gravity.

10. In a gravity separator of claim 9, a coalescing unit in which the coalescing media comprise a fibrous web.

11. In a gravity separator of claim 9, a coalescing unit in which the coalescing media comprise a web of glass fibers.

12. In a gravity separator of claim 9, a coalescing unit in which the microfibers are blown from polymers based on olefin or styrene.

13. In a gravity separator of claim 9, a coalescing unit in which the microfibers are blown from polymers based on ethylene, propylene, or styrene.

* * * * *